United States Patent [19]

Kaneko

[11] Patent Number: 4,729,642
[45] Date of Patent: Mar. 8, 1988

[54] TIME-SHARING DRIVING METHOD FOR A CHIRAL SMECTIC LIQUID CRYSTAL SHUTTER

[75] Inventor: Syuzo Kaneko, Tokyo, Japan
[73] Assignee: Canon Kabushiki Kaisha, Tokyo, Japan
[21] Appl. No.: 33,882
[22] Filed: Apr. 2, 1987

Related U.S. Application Data

[60] Continuation of Ser. No. 759,138, Jul. 26, 1985, which is a division of Ser. No. 567,500, Jan. 3, 1984, Pat. No. 4,548,476.

[30] Foreign Application Priority Data

Jan. 14, 1983 [JP] Japan .................... 58-5052

[51] Int. Cl.$^4$ ............................................ G02F 1/13
[52] U.S. Cl. ............................ 350/350 S; 350/333
[58] Field of Search ............................ 350/333, 350 S

[56] References Cited

U.S. PATENT DOCUMENTS

| | | | |
|---|---|---|---|
| 4,367,924 | 1/1983 | Clark et al. | 350/334 |
| 4,508,429 | 4/1985 | Nagae et al. | 350/350 S |
| 4,548,476 | 10/1985 | Kaneko | 350/350 S |

OTHER PUBLICATIONS

Clark & Lagerwall, "Submicrosecond Bistable Electrooptic Switching et al.", Appl. Phys. Lett., 36, No. 11,899,901 (Jun. 1980).

Primary Examiner—Stanley D. Miller
Assistant Examiner—Richard F. Gallivan
Attorney, Agent, or Firm—Fitzpatrick, Cella, Harper & Scinto

[57] ABSTRACT

In a time-sharing driving method for a device comprising electrode matrix wherein the electrode matrix comprises two electrode groups oppositely spaced from each other, each comprising a plurality of electrodes, the two electrode groups being arranged so as to interesect with each other to form matrix intersecting points, one electrode group being assigned to serve as a row electrode while the other electrode group is assigned to serve as a signal electrode, voltage being applied to each row electrode in a time-sharing manner, the time-sharing driving method is characterized in that voltage applied to a selected point in an addressed row electrode is in a direction opposite to that of voltage applied to the other matrix intersecting points.

19 Claims, 12 Drawing Figures

TIME-SHARING DRIVING METHOD FOR A CHIRAL SMECTIC LIQUID CRYSTAL SHUTTER

This application is a continuation of application Ser. No. 759,138 filed July 26, 1985, which is a division of application Ser. No. 567,500 filed Jan. 3, 1984, now U.S. Pat. No. 4,548,476.

BACKGROUND OF THE INVENTION

1. Field of the Invention

The present invention relates to a driving method for optical modulation devices such as liquid crystal devices, and more particularly to a time-sharing driving method for liquid crystal device for use in optical modulation devices such as display elements or optical shutter arrays. Specifically, the present invention is concerned with a time-sharing driving method suitable for liquid crystal devices bistable liquid crystals.

2. Description of the Prior Art

Hitherto, liquid crystal display devices have been well known, wherein a group of scanning electrodes and a group of signal electrodes are arranged so as to intersect with each other and form a matrix, and liquid crystal compounds are filled into a space defined by these electrodes, thereby to form a large number of picture elements to display images or information. A time-sharing driving method is employed for driving these display devices. The time-sharing driving method is featured by sequentially and cyclically effecting selective application of address signals to a group of common electrodes serving as scanning electrodes, and effecting selective application of predetermined information signals in a parallel fashion in synchronism with address signals. However, the display devices and the driving method therefor have serious drawbacks referred to below.

Namely, it is difficult to obtain a high density of picture elements and a large image area. Most of liquid crystals which have been put into practice for display devices are TN (twisted nematic) type liquid crystals because they show a relatively high response speed and a small power dissipation among the conventional liquid crystals. These TN type liquid crystals are described for example by M. Schadt and W. Helfrich, "Voltage Dependent Optical Activity of a Twisted Nematic Liquid Crystal" Applied Physics Letters, Vol. 18, No. 4 (Feb. 15, 1971 pp. 127–128). In the liquid crystal of this type, molecules of nematic liquid crystal having a positive dielectric anisotropy, under application of no electric field form a twisted structure (helical structure) in the direction of the thickness of the liquid crystal layer and aligned or oriented parallel to each other at the both electrode surfaces. On the other hand, under application of an electric field, nematic liquid crystals having a positive dielectric anisotropy are aligned in the direction of the electric field, thereby making it possible to cause optical modulation. A display device having a matrix electrode structure may be constituted using a liquid crystal of this type. In this instance, a voltage higher than a threshold level required for orienting liquid crystal molecules in the direction perpendicular to the electrode surfaces is applied to a region (a selected point) where a scanning electrode and a signal electrode are concurrently selected, whereas no voltage is applied to a region (a non-selected point) where a scanning electrode and a signal electrode are not concurrently selected, and therefore, liquid crystal molecules maintain their stable alignment in parallel with the electrode surfaces. When linear polarizers arranged in the relationship of cross nicols, i.e., with their polarizing directions being substantially perpendicular to each other are provided on the upper and lower sides, respectively, of the liquid crystal cell, light does not transmit at the selected points but transmits at the non-selected points thereby making it possible to constitute an image device. However, when a matrix electrode structure is constituted, a certain electric field is applied to a region where a scanning electrode is not selected while a signal electrode is selected so-called "half-selected point"). If the difference between the voltage applied on the selected points and that applied on the half-selected points is sufficiently large, and the voltage threshold level required for orienting liquid crystal molecules in the direction perpendicular to the electrode surfaces is set to a voltage therebetween, the display devices operate normally. Actually, however, according as the number (N) of scanning lines increase, the time (duty ratio) during which effective electric field is applied on one selected point when the whole image area (one frame) is scanned, decreases in the proportion of 1/N. For this reason, the larger is the number of scanning lines, the smaller is the effective voltage which is a difference in voltage applied between selected points and non-selected points when repeatedly scanned. This leads to inherent drawbacks that image contrast is lowered and there occurs crosstalk. To overcome these drawbacks, the voltage averaging method, the two frequency driving method or the multiple matrix method have been previously proposed. However, none of these methods is sufficient to overcome the drawbacks stated above. Thus, it is the present state that the enlargement of image area or the densification of picture elements in respect to display devices is delayed because of the fact that it is difficult to sufficiently increase the number of scanning lines.

Meanwhile, a printer is proposed, wherein there is employed a system comprising means of changing electrical image signals into optical signals using a liquid crystal-shutter array, and irradiating optical signals to an electrophotographic photosensitive member thereby to form images. The liquid crystal-shutter array comprises microshutters of liquid crystal cells arranged in the form of an array and can selectively output transmitted lights by making use of electro-optical modulation of the liquid crystal as a microshutter.

The advantages given by the liquid crystal-optical shutter array are as follows:

(1) When applied to an electrophotographic printer, the printer becomes small in size.

(2) There is no mechanically movable part such as a polygon scanner as used in an LBP (Laser Beam Printer), resulting in no noise and small requirement in respect to the strict mechanical precision.

The fact that a liquid crystal-shutter array can offer these advantages leads to the possibility of affording improved reliability, light weight and reduced cost. However, there practically exist various difficulties, which will be explained by way of example.

Figure 1:
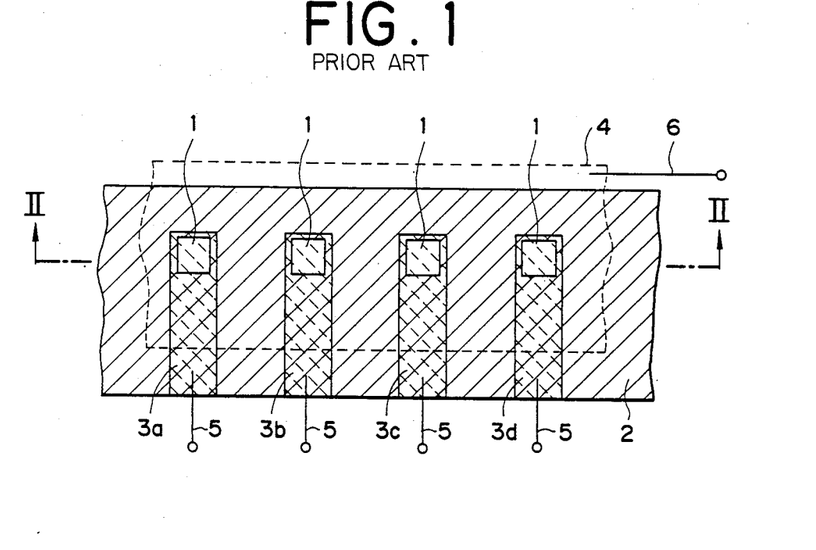
FIG. 1 is a plan view illustrating a prior art liquid crystal-optical shutter.

Referring to FIG. 1, there is shown an example of a liquid crystal shutter array which would be most easily understood.

As shown in FIG. 1, there are provided openings 1 of the shutter, and the remaining parts except for the openings are usually masked so that light leakage does not occur. Liquid crystal is hermetically disposed between signal electrodes 3 (3a, 3b, 3c, 3d . . . ) provided at the inner wall surface of a base plate 2 and common electrodes 4 disposed opposite to signal electrodes 3. Each common electrode 4 is formed on a base plate (not shown) of a transparent plate of glass, plastics, etc. Likewise, the base plate 2 on which signal electrodes 3 are provided may be formed of a transparent plate of glass, plastics, etc. These base plates are spaced apart at a predetermined interval by a seal spacer (not shown) of a polyestel film, an eposy adhesive agent into which glass fiber is mixed or frit glass. Each of the signal electrodes 3 and the common electrode 4 may be formed of a transparent conductive film of indium oxide, tin oxide, ITO (indium oxide containing about 5% by volume of tin oxide), etc. Lead wires 5 and a lead wire 6 are drawn out from these electrodes 3 and 4, respectively, and are connected to a shutter array driving circuit (not shown).

Figure 2:
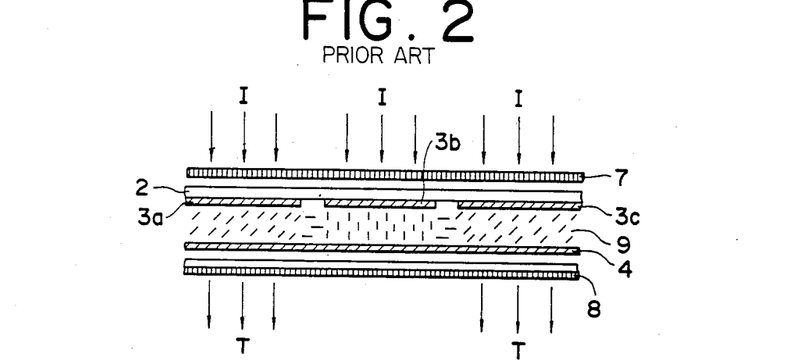
FIG. 2 is a cross sectional view of the liquid crystal-optical shutter taken along the line I—I in FIG. 1, FIGS. 3(a) and 3(b) are plan views each diagrammatically showing electrode structure employed in the present invention.

FIG. 2 is a cross sectional view taken along the line II—II of the liquid crystal-optical shutter array illustrated as a plan view in FIG. 1. Referring to FIG. 2, an example of the operation of the shutter array is schematically shown.

The opening and closing operation of the shutter array is effected as follows. The orientation of liquid crystal 9 interposed between signal electrode 3 and common electrode 4 opposite thereto is controlled by selecting signal electrode 3 (3a, 3b, 3c, . . . ) to which voltage is applied. Thus, transmitted light T is determined in response to irradiated light I.

In FIG. 2, polarizing plates 7 and 8 are disposed in the arrangement of cross nicols, i.e. with their polarizing directions being substantially perpendicular to each other. The orientation treatment has been applied to the two base plates by a method such as rubbing in such a manner that the initial orientation direction forms an angle of 45°, respectively, with respect to the polarizing directions of polarizing plates 7 and 8. In this example, a liquid crystal having a positive dielectric anisotropy (P-type liquid crystal) is used as liquid crystal 9.

In this arrangement of the liquid crystal-shutter array, selected voltages are applied to signal electrodes 3a, 3b, 3c, . . . and common electrode 4 is earthed.

In the operation shown in FIG. 2, for example, a relatively large voltage is applied on the signal electrode 3b, and P-type liquid crystal molecules align substantially perpendicular to the surfaces of the cell. In this instance, the irradiated light I is not transmitted through the signal electrode 3b. On the contrary, as a relatively small voltage of zero or less than the threshold level is applied to signal electrodes 3a and 3c, the alignment or orientation of the P-type liquid crystal molecules corresponding to electrodes 3a and 3c is changed. Thus, the irradiated light I is transmitted as transmitted light T. In this operating method, by using a monochromatic light as the irradiated light I, a higher contrast is obtained. However, even if white light is used, a sufficient contrast can be obtained.

By repeatedly effecting the above-mentioned operation, the shutter array provides image signals to be photosensitive member, etc.

The above-mentioned liquid crystal driving method can be practised with the simplest structure, but has a drawback that the driving speed is low. This drawback is based on the fact that the change from the "off" state of the shutter, i.e. the state giving an orientation of the liquid crystal under high electric field to the "on" state is dependent solely upon natural reverting force to the initial orientation (obtained, e.g. by rubbing) of the liquid crystal under the zero electric field or weak electric field. Further, a serious drawback is pointed out in realizing low cost. Assume now that the openings are aligned in a manner shown in FIG. 1. If an attempt is made to design a shutter array with a density of picture elements of 10 dot/mm and a length corresponding to the lateral width of size A4, about 2,000 signal electrodes are required. Accordingly, about 2,000 drivers are required for driving respective signal electrodes.

This means that 40 integrated circuit (IC) chips for drivers are required when IC Chips having 50 pins are used, thus resulting in a limitation in reducing cost.

For this reason, another attempt is proposed to divide a common electrode into a plurality row electrodes. Thus, the plurality row electrodes are so arranged in combination with signal electrodes to form a matrix of electrodes, thereby reducing the number of signal electrodes. With respect to each row of the common electrodes, the opening and closing operation of the shutter is effected in a time-sharing manner. However, when such a configuration is applied a liquid crystal shutter array, there is a possibility that light is transmitted not only from a row electrode at which the opening and closing operation of the shutter is effected, but also from another row electrode to be placed in shutter off condition, thus failing to give high performance.

SUMMARY OF THE INVENTION

An object of the present invention is to provide a time-sharing driving method overcoming the above-mentioned problems, that is, enabling realization of low cost, improving reliability, and exhibiting secured performance without erroneous operation.

Another object of the present invention is to provide a time-sharing driving method which responds at a high speed and does not cause crosstalk.

Another object of the present invention is to provide a time-sharing driving method suitable for a liquid crystal device in which a liquid crystal having bystability is used.

The time-sharing driving method according to the present invention is adapted for a device comprising an electrode matrix which comprises a pair of electrode groups, each comprising a plurality of elongated electrodes, and the pair of electrode groups intersect with each other to form matrix intersecting points. One of the pair of electrode groups is assigned to serve as scanning electrodes (row electrodes). These scanning electrodes are sequentially addressed and subject to application voltage in a time-sharing manner. The method of the invention is characterized in that the direction of voltage applied to a selected matrix intersecting point in a scanning electrode addressed at a time is opposite to that of the voltages applied at that time to the other matrix intersecting points. The time-sharing driving method according to the present invention is additionally characterized in that the pair of electrode groups are disposed opposite to each other with a ferroelectric liquid crystal (e.g. chiral smectic C liquid crystal) interposed therebetween.

DESCRIPTION OF THE PREFERRED EMBODIMENTS

The present invention will be described with reference to accompanying drawings.

Figure 3A:
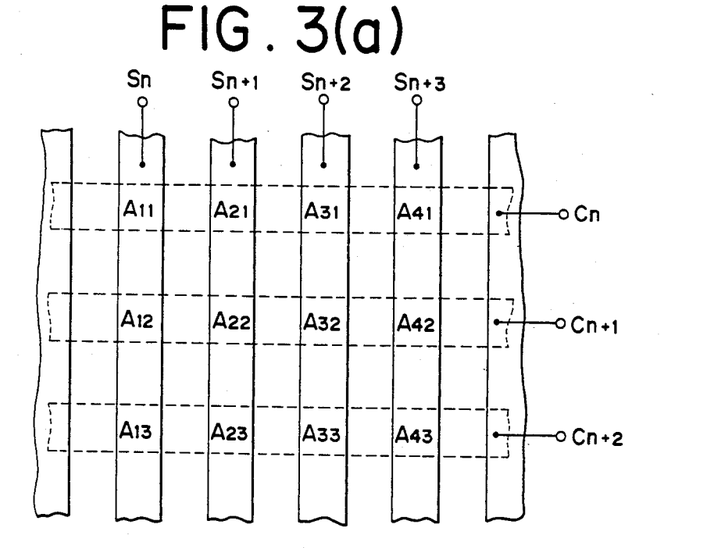
Figure 3B:
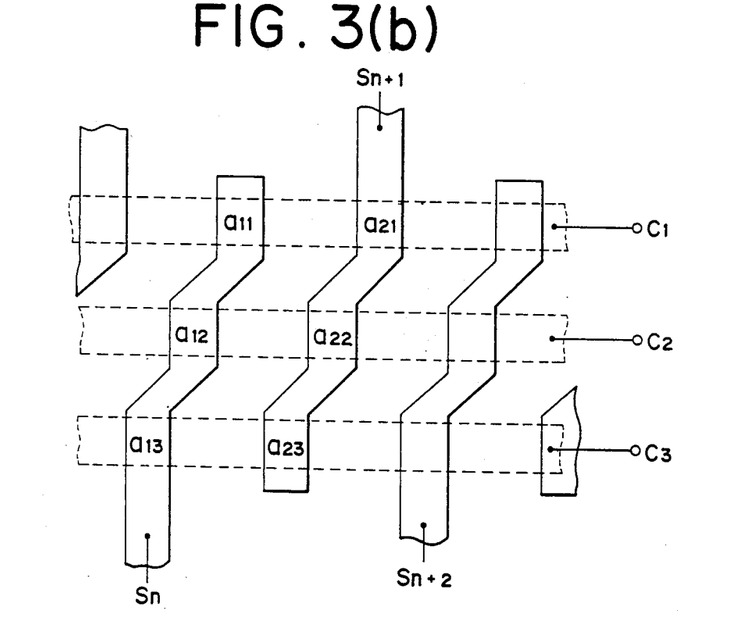

FIG. 3 and other figures subsequent thereto schematically illustrate the operation of the method according to the present invention.

FIGS. 3(a) and 3(b) show examples of an electrode structure to which the present invention is applied. Basically, a plurality of elongated or strip-like common electrodes scanning electrodes $C_1, C_2, \ldots C_n \ldots$ are arranged in a manner to form rows on a first electrode base plate, respectively. Further, a plurality of elongated or strip-like signal electrodes $S_1, S_2, \ldots, S_n \ldots$ are arranged in a manner to form columns on a second electrode base plate and to face the common electrodes while intersecting therewith, whereby a matrix of electrodes is formed by these common and signal electrodes. FIG. 3(a) shows that intersecting or crossing points $A_{11}, A_{21} \ldots, A_{12}, A_{22} \ldots, A_{13}, A_{23} \ldots$ of opposite electrodes are arranged as a matrix of a square check pattern. FIG. 3(b) shows that the intersecting points $a_{11}, a_{21} \ldots a_{12}, a_{22} \ldots a_{13}, a_{23} \ldots$ are arranged as a matrix wherein each signal electrode is generally obliquely disposed.

Figure 4A:
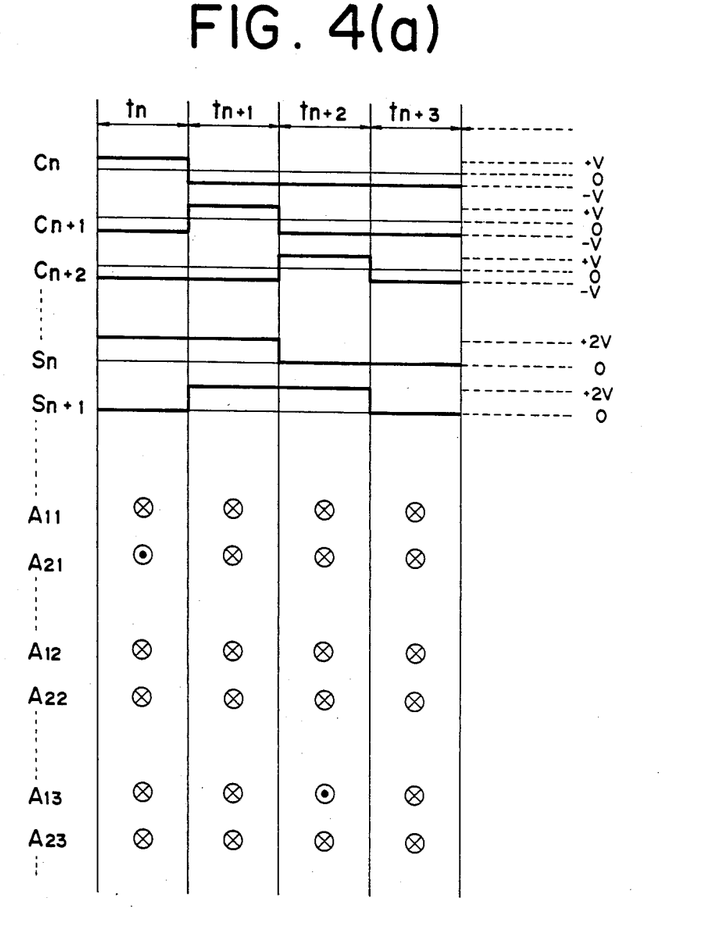
FIGS. 4(a) and 4(b) are explanatory views each diagrammatically showing the direction of the voltage applied on each intersecting point in a time series manner.

According to the present invention, the direction of voltage applied at each crossing point is determined sequentially point by point or line by line in a time-sharing manner. Each direction of the voltage applied at the crossing points in the row electrodes which are not addressed is kept constant. In connection with the example of electrode structure as shown in FIG. 3(a), an example of a method of applying voltage is explained by reference to FIG. 4(a). In FIG. 4(a), $t_n$ denotes a time interval for addressing a row of common electrode $C_n$. Among the common electrodes arranged in rows, a voltage of $+V$, for example, is applied to a row addressed, while a voltage of $-V$ is applied to the other rows which are not addressed. Accordingly, at a time interval of $t_n$, a voltage of $+V$ is applied solely to the common electrode $C_n$, while a voltage of $-V$ is applied to the other common electrodes $\ldots, C_{n-1}, C_{n+1}, C_{n+2} \ldots$.

On the other hand, the values of the signal voltage applied to signal electrodes arranged in columns are selected so that one is larger than $+V$ by an appropriate difference and the other is between $-V$ and $+V$. For example, $+2$ V and 0 V are selected.

In FIG. 4(a), there shown directions of voltages applied at the intersecting points $A_{11}, A_{21}, A_{12}, A_{22}, A_{13}$ and $A_{23}$ selected as representatives from all the intersecting points. In the drawing, the points marked by $\otimes$ show that the voltage applied is directed from the second electrode plate (signal electrode plate) to the first electrode plate (common electrode plate), that is, the electric potential at the side of the second electrode plate is higher than that at the side of the first electrode plate. Further, the points maked by $\bullet$ show that the opposite direction of voltage is applied thereat.

The behavior as to how the voltage is directed will be described in accordance with time series. At a time of $t_n$, the direction of the voltage at the intersecting points in the rows other than the row of $C_n$ is all $\otimes$. The voltage of $-V$ is applied to the all rows except for the row of the common electrode $C_n$. On the contrary, the voltage applied to each signal electrode $\ldots, S_n, S_{n+1} \ldots$ is either $+2$ V or 0 V. In either case, the electric potential at the signal electrodes on the second electrode plate is higher than that at the electrodes $\ldots C_{n-1}, C_{n+1}, C_{n+2}$ on the first electrode plate. The direction of the voltage at the intersecting points $A_{12}, A_{22}, A_{13}$, and $A_{23}$ is thus indicated by $\otimes$.

On the other hand, with respect to the intersecting points $(A_{11}, A_{21})$ defined by the common electrode row $C_n$ and signal electrodes $S_n$ and $S_{n+1}$, as the voltage applied to the signal electrode $S_n$ is $+2$ V, it is larger than that of $+V$ applied to the common electrode $C_n$. In this instance, the direction of the voltage at the inter point $A_{11}$ is indicated by $\otimes$. On the contrary, as the signal voltage of the signal electrode $S_{n+1}$ is 0 volt, it is smaller than that of $+V$ applied to the common electrode $C_n$. Accordingly, the direction of the voltage at the intersecting point $A_{21}$ is indicated by $\bullet$. Namely, when the voltage applied to the common electrode $C_n$ is $+V$ and the voltage applied to the signal electrode $S_{n+1}$ is 0, the direction of the voltage indicated by $\bullet$ is given.

In FIG. 4(a), at a time interval of $t_n$ for addressing the common electrode row $C_n$, the direction of the voltage at the intersecting point $A_{11}$ and $A_{21}$ is indicated by $\otimes$ and $\bullet$, respectively. Then, at a time interval of $t_{n+1}$, the common electrode row $C_{n+1}$ is addressed. The voltage of $+V$ is applied to the common electrode $C_{n+1}$ among common electrodes $\ldots, C_n, C_{n+1}, \ldots,$ while the voltage of $-V$ is applied to the other common electrodes.

In FIG. 4(a), there is shown an example wherein at a time interval of $t_{n+1}$, the voltage of $+2$ V is applied to the both signal electrodes $S_n$ and $S_{n+1}$. Accordingly, the electric potential of the signal electrode on the second electrode plate is higher than that of the common electrode $C_{n+1}$ on the first electrode plate. In this instance, the direction of the voltage at the intersecting points $A_{12}, A_{22}$ is indicated by $\otimes$. At this time, the voltage applied to the common electrodes $\ldots C_{n-1}, C_n, C_{n+2}, \ldots$ is $-V$, and the electric potential appearing at the signal electrodes $S_n, S_{n+1}$ is $+2$ V. Accordingly, the direction of the voltage at the intersecting points $A_{11}, A_{21} \ldots A_{13}, A_{23} \ldots$ is indicated by $\otimes$. At a time interval of $t_{n+2}$, the voltage applied to the common electrode $C_{n+2}$ is $+V$, while the voltage applied to the other common electrodes . . . $C_{n-1}$, $C_n$, $C_{n+1}$, $C_{n+3}$ . . . is $-V$. At this time, the voltage of zero volts and $+2V$ is applied to the signal electrodes $S_n$ and $S_{n+1}$, respectively. Accordingly, at the intersecting point $A_{13}$ defined by the electrodes $C_{n+2}$ and the signal electrode $S_n$, the electric potential at the common electrode $C_{n+1}$ ($+V$) on the first electrode plate is higher than that at the signal electrode $S_n(O)$ on the second electrode plate, and the direction of the voltage is indicated by ●. In contrast, at the intersecting point $A_{23}$ defined by the common electrode $C_{n+2}$ and the signal electrode $S_{n+1}$, the electric potential at the signal electrode $S_{n+1}$ (2 V) on the second electrode plate is higher than that at the common electrode $C_{n+2}$ ($+V$) on the first electrode plate. The direction of the voltage is, of course, indicated by ⊗ at intersecting points corresponding to the other rows. Further, it will easily be understood that, at a time period of $t_{n+3}$, the direction of the voltage at the intersecting points $A_{11}$, $A_{21}$, $A_{12}$, $A_{22}$, $A_{13}$, $A_{23}$ is indicated by ⊗. Thus, a row to be addressed is determined by applying $+V$ to a row electrode, and by applying $-V$ to the other row electrodes among common electrodes . . . , $C_n$, $C_{n+1}$, . . . . Further, by selectively applying a signal voltage of $+2$ V or 0 volt to signal electrodes . . . $S_n$, $S_{n+1}$, . . . arranged in columns, where the signal voltage is 0 volt, at the intersecting points corresponding to the addressed row electrode, the direction of the voltage can be reversed with respect to that at the other intersecting points.

Figure 4B:
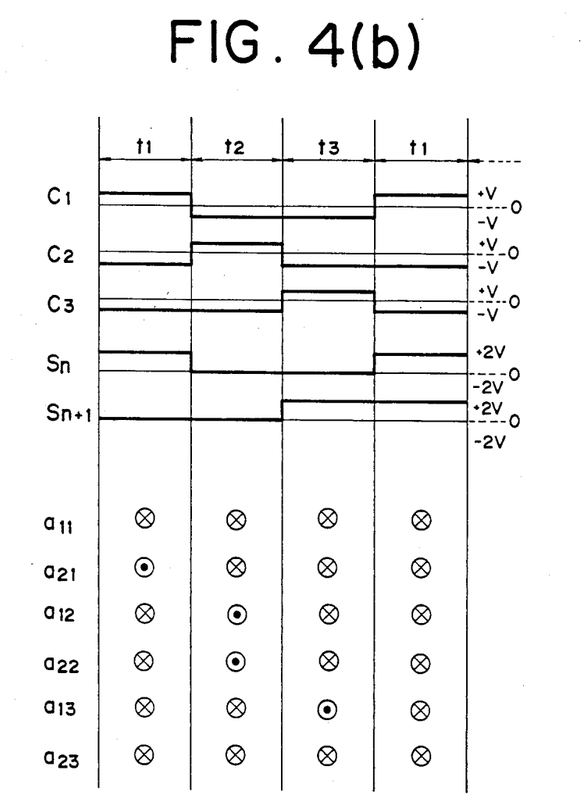

The same holds true with the structure shown in FIG. 3(b). The time chart illustrating how the voltage is applied to the structure in FIG. 3(b) is shown in FIG. 4(b). At a time interval of $t_1$, a voltage $+V$ is applied solely to the common electrode $C_1$, and a voltage $-V$ is applied to the common electrodes $C_2$ and $C_3$. At a time interval of $t_2$, the voltage $+V$ is applied solely to the common electrode $C_2$, and the voltage $-V$ is applied to the common electrodes $C_2$ and $C_3$. At a time interval of $t_3$, the voltage $+V$ is applied solely to the common electrode $C_3$, and the voltage $-V$ is applied to the common electrodes $C_1$ and $C_2$. In this example shown in FIG. 4(b), at a time interval of $t_1$, the direction of the voltage is indicated by ●; solely at the intersecting point $a_{21}$ among intersecting points $a_{11}$ and $a_{21}$ designated by the common electrode $C_1$ and the signal electrodes $S_n$, $S_{n+1}$ at a time interval of $t_2$, the directions of the voltages at both of intersecting points $a_{12}$ and $a_{22}$ are indicated by ●, and at a time interval of $t_3$, the direction of the voltage is indicated by ● solely at the intersecting point $a_{13}$ among intersecting points $a_{13}$, $a_{23}$.

Thus, according to the above example of the invention the direction of a voltage at an intersecting point selected from those in the addressed row can be opposite to that at the intersecting points which are not selected. The same relationships can be established in a different way. Namely, for instance, a voltage $-V_1$ is applied solely to a row addressed among a plurality of common electrodes, and a voltage $+V_1$ is applied to the other rows. Further, for example, a signal voltage of $-2V_1$ or 0 volt is supplied to signal electrodes arranged in columns. The direction of the voltage solely at an intersecting point at which the voltage of the signal electrode is 0 volt among those in the row addressed by the application of $-V_1$ can be opposite to that at other intersecting points. Namely, the electric potential at the common electrode of rows not addressed is $+V_1$, the signal voltage is $-2V_1$ and 0 volt each of which is lower than $+V_1$. Further, the electric potential at the common electrode of the row addressed is $-V_1$. The electric potential at the signal electrode at which the signal voltage is $-2V_1$ is lower than those at the common electrodes, while the electric potential at the signal electrode at which the signal voltage is 0 volt is higher than that at the common electrode addressed.

Reference has been made to examples wherein the signal voltage is $-2V$ or 0 volt and the voltage applied to the common electrodes is $+V_1$ and $-V_1$. However, it is needless to say that some change from the above-mentioned voltage values is possible as long as it is not contrary to the gist of the present invention. Namely, the voltage exemplified as $-2V_1$ is now labelled by $B_1$, the voltage exemplified at 0 is labelled by $B_2$, the voltage exemplified at $+V_1$ is labelled by $B_3$, and the voltage exemplified as $-V_1$ is labelled by $B_4$. It is sufficient if the relationships $B_1 < B_4 < B_2 < B_3$ hold with sufficient differences between respective values. Likewise, if the above-mentioned values denoted by $+2$ V, 0, $-V$ and $+V$ are replaced by $b_1$, $b_2$, $b_3$ and $b_4$, respectively, it is sufficient if the relationships $b_1 > b_4 > b_2 > b_3$ hold. Namely, the method according to the present invention is featured as follows. Assume that, among the voltages applied to the common electrodes, the voltage of the addressed row is labelled by $D_4$, and the voltage of the non-addressed rows is labelled by $D_3$. Further, assume that, among the signal voltages the signal voltage applied to the selected signal electrode forming the intersecting points at which the direction of the voltage applied between the plates is made opposite to that at the other intersecting points, is labelled by $D_2$, and the signal voltage applied to the non-selected signal electrodes forming the intersecting points at which the direction of the voltage between the plates is kept the same as that at the intersecting points in the other non-addressed rows is labelled by $D_1$. According to the invention, the sign (polarity) of $D_2-D_4$ is made different from that of $D_2-D_3$, $D_1-D_4$ and $D_1-D_3$.

The present invention can completely prevent crosstalk between electrodes or erroneous operation which has been considered as a serious problem in the prior art. Namely, the method of the present invention is most suitable as a method of driving a device wherein different states are obtained in accordance with one direction or the opposite direction of a voltage applied thereto. Examples of the most suitable devices include an image display device an optical shutter array, and the like in which a ferroelectric liquid crystals is interposed at the matrix crossing points.

Chiral smectic liquid crystals having a ferroelectricity are most preferable as liquid crystals having a bistable state property usable in the driving method according to the present invention. Among them, chiral smectic $C(S_mC^*)$ or $H(S_mH^*)$ liquid crystals are suitable. These ferroelectric liquid crystals are disclosed, for example, in "LE JOURNAL DE PHYSIQUE LETTERS" 36(L-69) 1975, Ferroelectric Liquid Crystals; "Applied Physics Letters" 36(11) 1980, Submicro Second Bistable Electrooptic Switching in Liquid Crystals; "Solid State Physics" 16(141) 1981, Liquid Crystal. In the present invention, ferroelectric liquid crystals disclosed in these publication can be used.

Ferroelectric liquid crystals are characterized by having a spontaneous polarization, i.e., a polarization existing even under a state where no external force such as mechanical stress or electric field is applied. More specifically, the compounds (all classified under chiral smectic liquid crystals) shown hereinbelow with their chemical formulas, for example, exhibit a ferroelectric liquid crystal state within certain temperature ranges. In the chemical formulas, C with "*" denotes an asymmetric carbon atom.

1.

(n: 5, 6, 7, 8, 9, 10, 12, 14)

2.

(n: 5, 6, 7, 8, 10)

3.

(n: 6, 7, 8, 9, 10, 11, 12, 14)

4.

(n: 7, 8, 9, 10, 14)

5.

(n: 6, 8, 10, 14)

6.

(n: 7, 8, 9, 10)

7.

(n: 4, 8, 12)

8.

(m: 1, 2, 3, 4, 5)

9.

(l: 4, 5)

10.

(n: 9, 10)

-continued

11.

(n: 8, 9)

12.

(n: 5, 6, 7, 8, 9, 10)

13.

14.

Figure 5A:
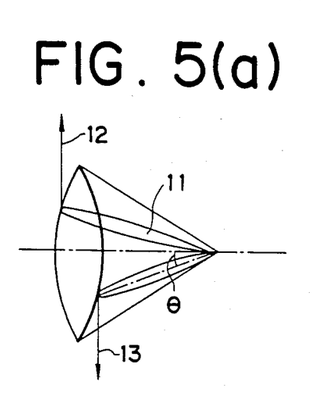
FIG. 5(a) is a perspective view diagrammatically showing the behavior of a chiral smectic liquid crystal in response to the direction of the voltage applied thereto.
Figure 5B:
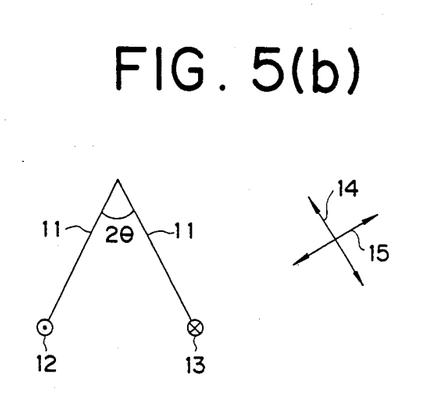
FIG. 5(b) is a plan view corresponding to FIG. 5(a)

Reference is briefly made to the operation of the ferroelectric liquid crystals. In FIGS. 5(a) and 5(b), reference numeral 11 denotes a ferroelectric liquid crystal molecule (e.g. chiral smectic liquid crystal). The ferroelectric liquid crystal molecule 11 is a long and slender molecule, as shown in Figure, representing anisotropy in respect of refractive index in the longitudinal direction and in the lateral direction. This liquid crystal is characterized in that the direction of the orientation is changed according to the change in the direction of electric field applied thereto as shown by an arrow 12 or 13 in Figure, respectively. Namely, for example, as shown in FIG. 5(b), the orienting direction of molecules with respect to the electric field in the direction 12 as indicated by ⊗ as explained hereinbefore and the orienting direction of molecules with respect to the electric field in the direction 13 as indicated by ⊙ form an angle of $2\theta$. Further, another characteristic feature of the liquid crystal is that the response of the orientation change caused by applying the electric field is rapid. For instance, a high response speed of the order of several $\mu$sec. can be obtained. To both sides of the liquid crystal cell containing the liquid crystal therein, a polarizer 14 is so disposed that the polarizing direction thereof will be in parallel with the orienting direction of the molecule due to the electric field direction in the direction ⊗, and an analyzes 15 is so arranged as to form cross nicols in combination with the polarizer 14. In this arrangement, when the direction of the molecular orientation within the cell is aligned with the orienting direction caused by the electric field directed in the direction ⊗, there does not occur double refraction with respect to the incident light. Accordingly, the light is shielded by the analyser so the light cannot be transmitted. In contrast, when the direction of the orientation is given by the electric field in the direction ⊙, there occurs a state where the light is transmitted due to the action of the double refraction.

Figure 6:
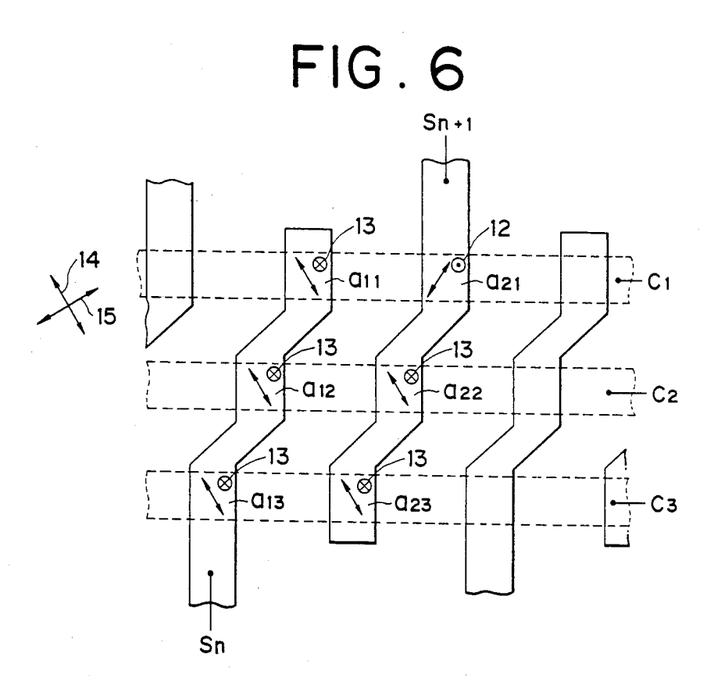
FIG. 6 is an explanatory view diagrammatically showing an example of the operational mode at a time interval of $t_1$.

Such a ferroelectric liquid crystal can be interposed between electrode plates, for instance, having the above-mentioned electrode structure shown in FIG. 3(a) or 3(b). In this instance, it is preferable that these electrodes are made of transparent material such as $In_2O_3$, $SnO_2$ or ITO (indium tin oxide) at least at the intersecting points designated by common electrodes on the first electrode plate and the signal electrodes on the second electrode plate. Preferably, a light shielding mask is implemented to the portion except for the intersecting points for the purpose of preventing undesirable leakage light. In the liquid crystal cell, the voltage is applied in the same manner as stated above, for instance, in accordance with the time chart shown in FIG. 4(b). In this instance, the voltage directions at respective intersecting points are as shown in FIG. 4(b). FIG. 6 shows the state at the time interval of $t_1$. Reference numerals 12 and 13, which are also respectively is quite fast. Second is that the orientation of the liquid crystal has bistable state property.

In order to effectively realize such a high response speed and bistability, it is preferable that the thickness of the cell is as thin as possible. Generally, it is suitable that the thickness thereof is of $0.5\mu$ to $20\mu$, particularly $1\mu$ to $5\mu$. A liquid crystal-electro-optical device having a matrix electrode structure in which such a ferroelectric liquid crystal is used is proposed, for example, in the U.S. Pat. No. 4,367,924 by Clark and Lagerwall.

In the manner described above, the operation of an optical shutter array operative based on a time-sharing driving method in which ferroelectric liquid crystal is used is made practical. It has been described that the common electrode is divided into three rows. However, it is easily understood that an arbitrary number of common electrode rows more than two can be used.

Figure 7:
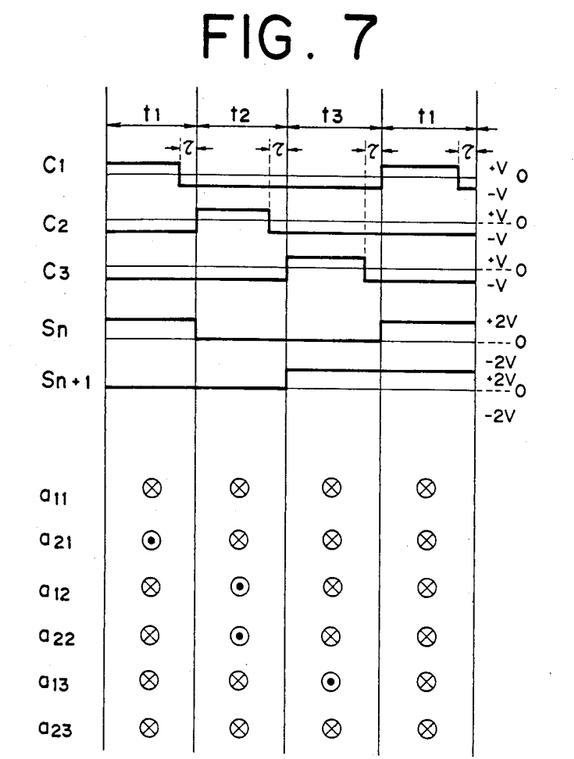
FIGS. 7 and 8 are explanatory views each showing another example of the voltage applied on each intersecting point in a time series manner.
Figure 8:
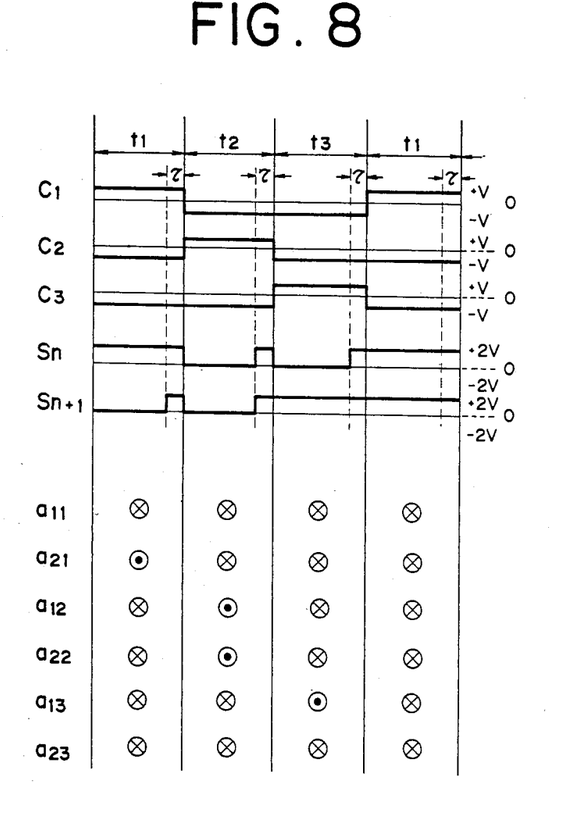

As appreciated from the above-description, the present invention makes it possible to provide an optical shutter array capable of reliably controlling the states of the transmission (ON) and the interruption (OFF) of the light. Further, it is possible to operate the optical shutter array in accordance with a time chart as shown in FIG. 7, in order to securely effect ON/OFF of the shutter array, particularly to securely attain the OFF condition thereby to improve the reliability. The operation based on FIG. 7 is characterized in that the time interval serving as an OFF signal interval is provided at each end portion of the address time intervals $t_1$, $t_2$, $5_3$ . . . in connection with each row. In this instance, two methods are possible. One is to apply the above-mentioned voltage $D_3$ to the common electrode rows at a time interval of $\tau$. The other is to apply the voltage $D_1$ to the all signal electrodes at a time interval of $\tau$ as shown in FIG. 8. Further, it is possible to securely effect the operation by effecting the both methods at the same time. FIG. 7 shows that the OFF voltage $D_3$ is applied to the common electrodes at a time interval of $\tau$ on the basis of the time chart shown in FIG. 4(b), wherein marks ● and ⊗ denote ON and OFF conditions, respectively.

The method of applying voltage in a time-sharing manner according to the present invention makes it possible to remarkably reduce the number of drivers, as explained with reference to the prior art. This means that the number of electrodes can be decreased as compared with the prior art. For instance, in accordance with the three rows time-sharing methods, it is understood that it is sufficient to add three (3) corresponding to the number of rows to one third of the number of electrodes required in the prior art.

Figure 9:
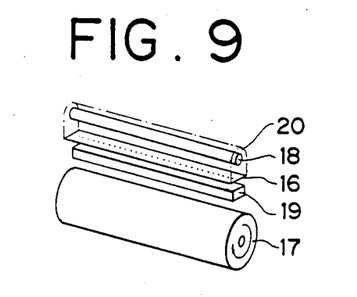
FIG. 9 is a perspective view schematically illustrating an example of arrangement for feeding an optical signal to a photosensitive member using a liquid crystal shutter.

The time-sharing driving method according to the present invention is essentially characterized in that the picture elements belonging to one line are divided into a plurality of rows, thereby effecting the recording and, in order to align the picture elements corresponding to one line of an image to be recorded, it is sufficient to modify signals using a line memory in the same manner as in the prior art time-sharing method. Referring to FIG. 9, there is shown a structure for providing an optical signal to a photosensitive member using a liquid crystal shutter array, wherein the indication of an electric charger is omitted. Reference numeral 16 denotes a liquid crystal-optical shutter array, reference numeral 17 denotes a photosensitive drum, reference numeral 18 denotes a light source (fluorescent lamp and the like), reference numeral 19 denotes a Selfoc lens array, and reference numeral 20 denotes a condensing cover member. As stated above, when a liquid crystal-optical shutter array as driven by the method of the invention is used, it is possible to constitute a compact printer in comparison with the prior art LBP (Laser Beam Printer).

Further, in the example of electrode structure shown in FIG. 3(a) of the invention, by interposing a ferroelectric liquid crystal at the intersecting points, a wide variety of application is provided including liquid crystal TV wherein signals are scanned point by point or line by line.

As stated above, the present invention, through the provision of a novel method of applying voltage in a time-sharing manner, results in advantages including low cost, high reliability and wider application thereof.

What is claimed is:

1. A signal application method for a device comprising driving points arranged in a plurality of rows, each driving point comprising a pair of oppositely spaced electrodes and a ferroelectric liquid crystal interposed therebetween having a first and a second stable orientation, comprising:
   addressing said plurality of rows of driving points row by row in a time sharing manner; and
   in an address period for an addressed row, (1) applying a first voltage signal, for providing a light-transmitting state based on said first stable orientation of the ferroelectric liquid crystal, at a driving point on the addressed row; said first voltage signal having first and second pulses; and (2) applying a second voltage signal, for providing a light-interrupting state based on said second stable orientation of the ferroelectric liquid crystal, at another driving point on the addressed row; said second voltage signal having third and fourth pulses; the first and fourth pulses being applied at different times, the second and third pulses being applied at different times, and the second and third pulses comprising voltages of mutually opposite polarities.

2. A signal application method according to claim 1, wherein said second and fourth pulses are applied at the same time and have the same voltage polarity.

3. A signal application method according to claim 1, wherein said ferroelectric liquid crystal is a chiral smectic liquid crystal.

4. A signal application method according to claim 1, wherein said chiral smectic liquid crystal is in the chiral smectic C phase.

5. A liquid crystal apparatus comprising:
   (a) a liquid crystal device comprising driving points arranged in a plurality of rows, each driving point comprising a pair of oppositely spaced electrodes and a ferroelectric liquid crystal interposed therebetween having a first and a second stable orientation; and
   (b) means for applying first and second voltage signals selectively to the driving points on an addressed row; said first voltage signal being a voltage signal for providing a light-transmitting state based on said first stable orientation of the ferroelectric liquid crystal and having first and second pulses; said second voltage signal being a voltage signal for providing a light-interrupting state based on said second stable orientation of the ferroelectric liquid crystal an having third and fourth pulses; the first and fourth pulses being applied at different times, the second and third pulses being applied at different times, and the second and third pulses comprising voltages of mutually opposite polarities.

6. A liquid crystal apparatus according to claim 5, wherein said means for selectively applying first and second voltage signals comprises a line memory.

7. A liquid crystal apparatus according to claim 5, wherein said second and fourth pulses are applied at the same time and have the same voltage polarity.

8. A liquid crystal apparatus according to claim 5, which further comprises a light source.

9. A liquid crystal apparatus according to claim 5, wherein said ferroelectric liquid crystal is a chiral smectic liquid crystal.

10. A liquid crystal apparatus according to claim 9, wherein said chiral smectic liquid crystal is in the chiral smectic C phase.

11. A printer comprising (a) a light signal generating unit which unit comprises (i) a light source, (ii) a liquid crystal microshutter array, (iii) a liquid crystal driving unit, and (iv) a polarizer and an analyzer arranged in cross nicols relationship, and (b) a photosensitive member disposed to be irradiated with light signals from the light signal generating unit;
   said liquid crystal microshutter array comprising a plurality of microshutters, each comprising a pair of opposite electrodes, and a ferroelectric liquid crystal disposed between the opposite electrodes and having a first and a second stable orientation;
   said liquid crystal driving unit for selectively applying a first and a second voltage signal to control the light-transmission and light-interruption of the microshutter array;

said first voltage signal being a voltage signal for providing a light-interrupting state based on said first stable orientation of the ferroelectric liquid crystal and having a first pulse capable of causing the ferroelectric liquid crystal to take the first stable orientation, said second voltage signal being a voltage signal for providing a light-transmitting sate based on said second stable orientation of the ferroelectric liquid crystal and having a second pulse capable of causing the ferroelectric liquid crystal to take the second stable orientation of a voltage polarity opposite to that of said first pulse, the polarizing direction of said polarizer being parallel to the direction of the first orientation of the ferroelectric liquid crystal when said first voltage signal is applied.

12. A printer according to claim 11, wherein said microshutters are arranged in a plurality of rows, and including means for applying said first and second voltage signals row by row to the microshutters.

13. A printer according to claim 11, wherein said liquid crystal driving unit comprises a line memory.

14. A printer according to claim 11, wherein said ferroelectric liquid crystal has a bistable state property.

15. A printer according to claim 14, wherein said ferroelectric liquid crystal is a chiral smectic liquid crystal.

16. A printer according to claim 15, wherein said chiral smectic liquid crystal is chiral smectic C or H liquid crystal.

17. An apparatus for time-sharing voltage application, comprising:

a matrix electrode arrangement comprising a plurality of common electrodes and a plurality of signal electrodes intersecting with the common electrodes, and voltage application means for (i) sequentially applying an address voltage to an addressed common electrode while applying a non-address voltage to a non-addressed common electrode, and (ii) applying signal voltages selectively to the signal electrodes in phase with the application of the address voltage; said signal voltages having mutually opposite polarities with respect to the address voltage and having the same polarity with respect to the non-address voltage.

18. An apparatus according to claim 17, which comprises a ferroelectric liquid crystal disposed between the common electrode and the signal electrodes.

19. An apparatus according to claim 18, wherein said ferroelectric liquid crystal is a chiral smectic liquid crystal.

* * * * *

UNITED STATES PATENT AND TRADEMARK OFFICE
CERTIFICATE OF CORRECTION

PATENT NO. : 4,729,642                              Page 1 of 3
DATED      : March 8, 1988
INVENTOR(S): SYUZO KANEKO It is certified that error appears in the above-identified patent and that said Letters Patent is hereby corrected as shown below:

AT [56] IN THE REFERENCES

Other Publications, "No. 11,899,901" should read --pp. 899-901--.

AT [56] IN THE REFERENCES

U.S. Patent Documents, insert
--4,655,561   4/1987   Kanbe et al.    350/333 X
  4,653,859   3/1987   Masaki          350/333
  4,563,059   1/1986   Clark et al.    350/350 SX
  4,613,209   9/1986   Goodby et al.   350/350 S
  4,472,026   9/1984   Boyd et al.     3509/333  --.

COLUMN 1

Line 19, after devices, insert --using--.

UNITED STATES PATENT AND TRADEMARK OFFICE
CERTIFICATE OF CORRECTION

PATENT NO. : 4,729,642
DATED : March 8, 1988
INVENTOR(S) : SYUZO KANEKO

It is certified that error appears in the above-identified patent and that said Letters Patent is hereby corrected as shown below:

COLUMN 12

Line 34, "respectively is" should read
--respectively marked by ⊙ and ⊗ at the intersecting points denote the respective voltage directions, and the arrows show the orienting directions of the liquid crystal molecules.

Reference numerals 14 and 15 denote the polarizing direction of the polarizer and the analyzer, respectively. Namely, at the time interval of $t_1$, there occurs a state where light is transmitted solely through the intersecting point $a_2$, at which the voltage direction is the one indicated by among intersecting points. In accordance with the time chart shown in Figure 4(b), at the time interval of $t_1$, light is transmitted solely through the intersecting point $a_{21}$ among intersecting points shown, at the time interval of $t_2$, light is transmitted through intersecting points $a_{12}$, $a_{22}$ among them, and at the time interval of $t_3$, light is transmitted solely through the intersecting point $a_{13}$. At the time interval of $t_1$ in the subsequent cycle, there occurs a state where light is not transmitted through both intersecting points $a_{11}$ and $a_{21}$. During the above mentioned operation, no light is transmitted through the intersecting points corresponding to the rows which are not addressed.

When such a ferroelectric liquid crystal is employed as an optical modulation device, two advantages will accrue. First is that the response speed is--.

Line 63, "5$_3$" should read --$t_3$--.

UNITED STATES PATENT AND TRADEMARK OFFICE
CERTIFICATE OF CORRECTION

PATENT NO. : 4,729,642                      Page 3 of 3
DATED       : March 8, 1988
INVENTOR(S) : SYUZO KANEKO It is certified that error appears in the above-identified patent and that said Letters Patent is hereby corrected as shown below:

COLUMN 13

Line 58, "time sharing" should read --time-sharing--.

COLUMN 14

Line 32, "an" should read --and--.

COLUMN 15

Line 9, "sate" should read --state--.

COLUMN 16

Line 25, "electrode" should read --electrodes--.

Signed and Sealed this

Second Day of August, 1988

Attest:

DONALD J. QUIGG

Attesting Officer               Commissioner of Patents and Trademarks